United States Patent
Kish, Jr.

[11] Patent Number: 6,149,127
[45] Date of Patent: Nov. 21, 2000

[54] SPRING LOADED COMPRESSION VALVE FITTING

[75] Inventor: Walter J. Kish, Jr., Las Vegas, Nev.

[73] Assignee: Kloehn Company, Ltd., Las Vegas, Nev.

[21] Appl. No.: 09/179,476

[22] Filed: Oct. 27, 1998

[51] Int. Cl.[7] ........................................... F16K 51/00
[52] U.S. Cl. ........................ 251/148; 251/174; 277/164
[58] Field of Search .................................. 251/148, 174, 251/170; 277/164

[56] References Cited

U.S. PATENT DOCUMENTS

| | | |
|---|---|---|
| 4,479,513 | 10/1984 | Koch et al. . |
| 4,572,239 | 2/1986 | Koch et al. . |
| 4,651,775 | 3/1987 | Okada . |
| 5,312,084 | 5/1994 | Weh ........................................ 251/148 |
| 5,833,212 | 11/1998 | Frei et al. ............................... 251/148 |
| 5,964,447 | 10/1999 | DuHack et al. ........................ 251/148 |

*Primary Examiner*—Kevin Lee
*Attorney, Agent, or Firm*—Kenneth L. Sherman, Esq.; Sherman & Sherman; Milord Keshishzadeh, Esq.

[57] ABSTRACT

An improved valve fitting configured to limit pressure exerted upon a surface of the valve by a sealing surface of the fitting to inhibit the sealing surface from deforming causing the valve to leak is provided. This causes the sealing surface of the fitting to exert a constant pressure upon a sealing surface of a valve body, when the fitting is coupled to the valve body, to form a continuous seal between the fitting and the valve, to inhibit leaks therebetween. When the fitting is coupled to the valve body, the compression member is compressed to limit the pressure that the sealing surface exerts on the valve body, to inhibit the sealing surface from distorting, or deforming, against internal componentry of the valve which can form gaps between the sealing surface and componentry, causing the valve to leak.

11 Claims, 1 Drawing Sheet

SPRING LOADED COMPRESSION VALVE FITTING

BACKGROUND OF THE INVENTION

1. Field of the Invention

The present invention relates generally to valves and valve systems, and more particularly, to a valve fitting configured to limit pressure exerted upon a valve surface by a fitting's sealing surface so as to inhibit the sealing surface from deforming and thereby causing the valve to leak.

2. Description of Related Art

Valves and valve systems are well known for halting and controlling the flow of fluids through a passage, such as a pipe. A valve typically includes a device, such as a disk that is configured to mate with a valve seat. The device operates to seal an aperture through the valve seat. The disk is actuated in order to open and partially or wholly close the aperture and thereby control the fluid flow through the valve.

One common embodiment of valve devices is know as a ball type valve. Ball valves comprise a spherical plug or "ball shaped valve" and an annular valve seat that mates with the ball valve. The characteristic feature of the ball valve is that the surfaces of the annular valve seat and ball valve are surfaces of revolution, so that there is a negligible amount of thrusting force acting in the direction of the valve stem.

In ball valves that are intended for high pressure applications, the ball member is often trunnion supported with valve seats or seat rings. The valve seats or valve rings have the capability of floating and being pressure activated to seal against the ball. In larger dimensioned high pressure ball valves, means are typically provided to limit the amount of fluid pressure that acts on the seats. This prevents the imposition of destructively high compressive stress against the ball valve.

One such ball valve is disclosed in U.S. Pat. No. 4,479,513, by Koch et al., and U.S. Pat. No. 4,572,239, by Koch et al. Each of the Koch patents discloses a ball valve designed for high pressure shut-off at fluid pressures approaching the ultimate compressive stress of plastic annular seats that are employed in the valve. The ball member is trunnion mounted in order to carry the total force of the shut-off pressure. The seat rings are disposed in seat carriers. Each seat ring includes a spherical ball engaging surface having a radius slightly less that the radius of the ball.

In Koch, each carrier is continuously urged toward the ball by a plurality of disc springs in order that the seat ring engaging surfaces will be in continuous sealing engagement with the ball surface. The seat ring is configured so that the areas thereof located adjacent to the outer diameters of the ball are the first to engage the ball. The valve components are configured to limit the effective area that the fluid pressure may act on in urging the seat rings into the ball contact. Thus the compressive stress that is exerted on the plastic annular ring seat material is controlled.

U.S. Pat. No. 4,651,775, to Okada, also discloses a three-way ball valve. The disclosed valve includes a flow controlling ball valve of a hollow mushroom-like construction consisting of a spherical part and a cylindrical part. The Okada ball valve is configured to allow two fluids to flow side by side through half-cylindrical rooms of the valve and flow outward through holes in the half-cylindrical rooms for mixing of the two fluids. The mixed fluids then pass out through an outlet passage of the valve.

Often a fluid conduit, such as a pipe or tubing, is coupled to an outlet or an inlet of the valve body. A threaded fitting may be secured to an end of the conduit then threaded into an inlet or outlet aperture of the body for coupling the conduit to the valve body. However, the fitting must be threaded into the aperture under precise pressure to couple the fitting to the body. Coupling the fitting to the body under excessive pressure may cause a sealing surface of the fitting to distort, or deform, against the internal componentry of the valve. This distortion or deformation of the sealing surface can cause gaps between the sealing surface and componentry, causing the valve to leak and yielding inaccurate fluid volume and flow control. Coupling the fitting to the body under insufficient pressure may also leave a gap between the fitting and the valve, which can also cause the valve to leak. Even a minor amount of leakage and incorrect fluid volume throughflow is unacceptable in certain usages such as in the medical, biological and chemical fields.

Thus, there exists the need for a valve fitting that may be coupled to a valve body which fitting limits the pressure exerted upon sealing surface of the fitting. Such a fitting would inhibit the sealing surface from deforming which may cause the valve to leak and the fluid volume flow through to be inaccurate.

OBJECTS OF THE INVENTION

It is therefore an object of the present invention to provide an improved fitting that is configured to limit pressure exerted upon a valve body by a sealing surface of the fitting.

It is a further object of the present invention to provide a valve fitting which limits the pressure that a sealing surface of the fitting exerts upon a sealing surface of the valve body and minimize to inhibit leaks therebetween.

SUMMARY OF THE INVENTION

These and other objects and advantages of the present invention are achieved by providing an improved fitting which incorporates a compression member that biases a sealing surface of the fitting outwardly. This biasing causes the sealing surface of the fitting to exert a constant pressure upon a conduit and a sealing surface of a valve body when the fitting is coupled to the valve body. In this manner the coupling forms a continuous seal between the fitting and the valve, and the fitting inhibits leaks between the fitting and the coupling. The present invention may be used in any type of fluidic connection where over tightening is a problem such as manifolds, syringes or needle and probe connections.

When the fitting of the preferred embodiment of the invention is coupled to the valve body, a compression member is compressed to limit the pressure that the sealing surface exerts on the valve body. This compression further inhibits the sealing surface from distorting, or deforming, against the valve body. Distortion of the sealing surface forms gaps between the sealing surface and the valve, causing the valve to leak.

The invented fitting is configured for use in any one of a number of differently configured valve bodies. In the preferred embodiment, the fitting is configured for use with a family of precision flow control valves known in the art as "shear valves" and "miniature shear valves". These valves are often used in precise flow control applications, such as medical procedures for example. Shear valves are typically utilized in low pressure applications, with pressures ranging up to about 100 psig. (pounds per square inch, gauge). Shear valve bodies usually include a hollow insert that is retained in a cavity of the valve. The inner periphery of the insert is formed to mate with a valve plug of the valve for precisely controlling fluid flow through the valve body.

The fitting of the preferred embodiment of the present invention couples to an inlet or outlet port of a valve body, such as a shear valve body. The fitting comprises a hollow body having a plunger reciprocatingly retained therein. The plunger includes a sealing surface that projects outwardly from the hollow body. The sealing surface of the plunger is configured to abut an outer surface of a component of the valve body, such as the periphery of an aperture in the insert of the shear valve, when the fitting is coupled thereto. The compression member is also retained in the hollow body for biasing the plunger outwardly from body, so that its sealing surface contacts the periphery of insert's aperture when the fitting is coupled thereto. As the plunger, and thus the fitting, is threaded into the selected port of the valve body, the sealing surface of the plunger contacts the periphery of the aperture through a flanged end of the fitting's conduit.

The compression member has an elastic force that is sufficient to bias the sealing surface of the plunger against the periphery of the aperture with enough pressure to form a tight, continuous seal between the sealing surface of the plunger and the periphery of the insert's aperture.

The elastic force of the compression member also enables the compression member to be compressed, as the fitting is threaded into the selected port, and coupled to the port, of the valve body. This limits the pressure that the plunger's sealing surface exerts on the insert's outer surface to prevent the sealing surface of the plunger from distorting or deforming. Since the integrity of the sealing surface is maintained, no gaps are formed between the periphery of the insert's aperture, the conduit's flanged and sealing surface so that the formation of leaks therebetween is inhibited. Thus, the compression member biases the plunger outwardly with enough pressure to maintain a tight, continuous seal between with the insert's outer surface and fitting to prevent leaks therebetween, while limiting the pressure that the plunger exerts on the insert to prevent the plunger's sealing surface from deforming, thus further preventing leaks.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventor of carrying out the invention. Various modifications, however, will remain readily apparent to those skilled in the art, since the generic principles of the present invention have been defined herein.

Figure 1:
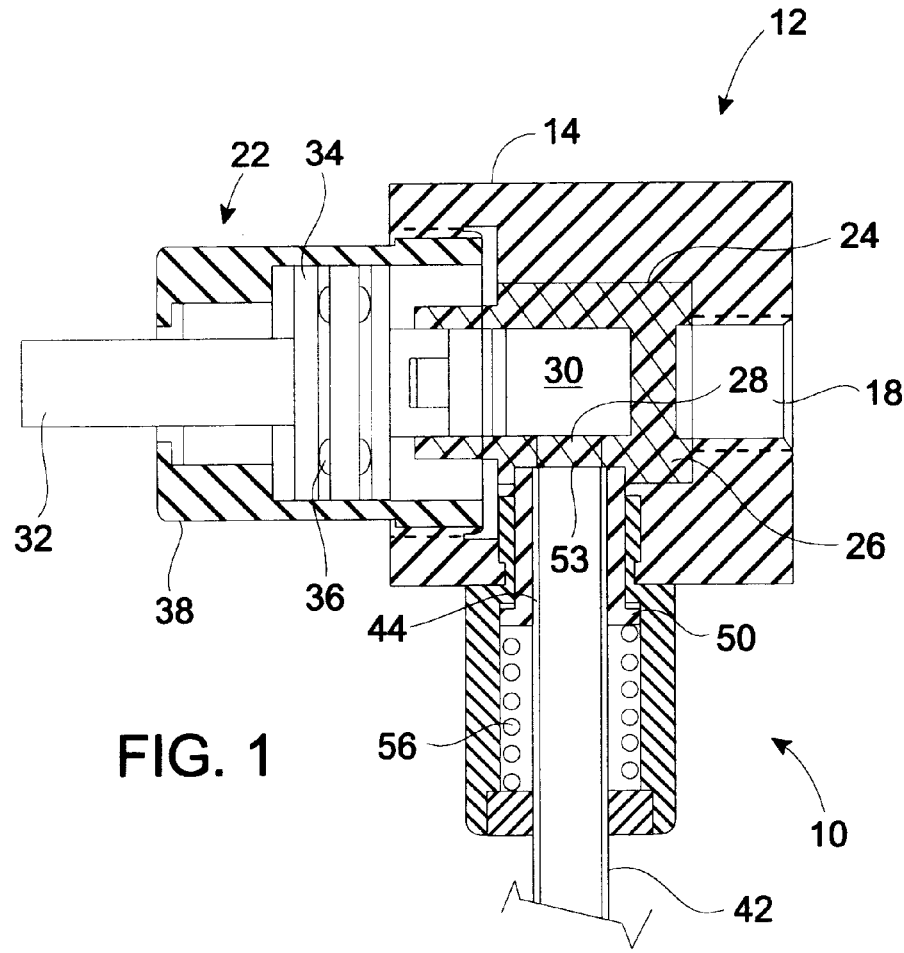
FIG. 1 is a cross-sectional, schematic view showing a shear valve having a fitting of the preferred embodiment of the present invention coupled thereto.

Referring now to FIG. 1 of the drawings, there is shown generally at 10, a preferred embodiment of an improved fitting constructed according to the principles of the present invention coupled to a valve 12, such as a shear valve. The fitting 10 of the preferred embodiment of the present invention is configured to exert a constant pressure upon a sealing surface of the valve 12 (to be thoroughly discussed hereinafter) and also limits the pressure that a sealing surface 46 of the fitting 10 exerts upon a surface of the valve 12, to inhibit leaks therebetween.

The fitting 10 may be configured for use with any suitable valve known in the art. In the preferred embodiment, the fitting 10 is configured for use with a family of precision flow control valves known in the art as "shear valves" and "miniature shear valves". These valves are often used to precisely control the flow of either a gas or other fluid in exact applications, such as medical procedures for example. These applications are typically low pressure, with pressures ranging up to about 100 psig. (pounds per square inch, gauge).

A shear valve 12 typically includes a valve body 14 that has an inlet port 16, at least one outlet port 18, a control port 20, and a cavity 24 communicating with the ports 16, 18, 20. In the preferred embodiment, valve body 14 may be approximately two cubic inches in size and are designed to operate at temperatures ranging from about 10 degrees to 100 degrees Celsius.

A flow control assembly 22, for controlling fluid flow, is retained in the control port 20. The flow control assembly 22 may include a hollow insert 26 dimensioned to be slip fit into the cavity 24. The insert 26 may be provided with an aperture 28 for each port 16, 18, 20.

A valve plug 30 is coupled to a valve driver 32, via a thrust bearing 34, for actuation by the valve driver 32. The thrust bearing and a spring 36 coact to maintain and control positioning of the valve driver 32, to maintain a desired flow path through the cavity 24. As the valve driver 32 is rotated, the plug 30 in the cavity 24 alternately seals one or more of the apertures 28 in the insert 26 to control flow through the valve 12.

The inner periphery of the insert 26 may be formed complementary to the periphery of the plug 30 for precisely controlling flow though the valve 12. A valve cap 38 is disposed about the valve driver 62 and flow control assembly 22 and affixed to the valve body 14, for coupling the assembly 22 to the valve body 12.

Figure 2:
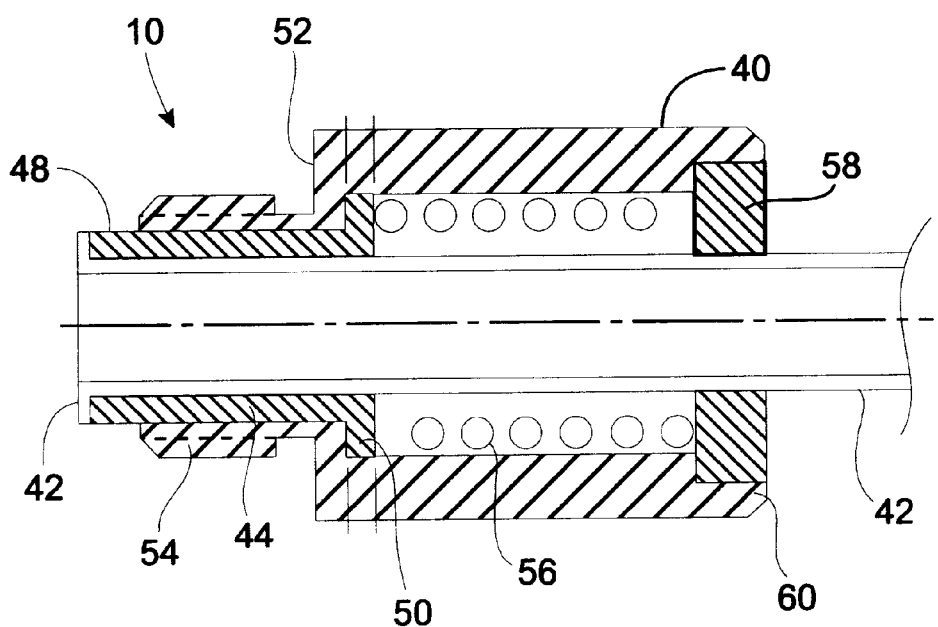
FIG. 2 is a cross-sectional, schematic view showing the fitting of the preferred embodiment of the present invention.

Referring to FIG. 1 and FIG. 2, the fitting 10 of the preferred embodiment of the present invention may be configured to couple to either the inlet port 16 or outlet port 18 of the valve 14. In the preferred embodiment, the fitting 10 may include a hollow body 40 to enable fluid flow therethrough, by means of a conduit 42, for example.

A hollow, elongated plunger 44 is reciprocatingly retained in the fitting's hollow body 40. The hollow plunger 44 is configured to allow the conduit 42 to pass therethrough. The plunger 44 includes a sealing surface 46 at an outwardly projecting end 48 thereof and a flanged end 50 slidably retained inside of the hollow body 40. In the preferred embodiment of the present invention the conduit 42 includes a flanged end 42a which fits between sealing surface 46 and the outer surface of insert 26 when the fitting is converted to the valve. At the other end, the plunger's flange end 50 is configured to abut the inner periphery of a seating shoulder 52 of the body 40 to prevent the plunger 44 from dislodging from the body 40.

The sealing surface 46 of the plunger 44 is configured to abut an outer surface, or sealing surface, of a component of the flow assembly 22. For example, the sealing surface 46 may be configured to abut the periphery 53 of any one of the insert's apertures 28 that is aligned with a port 16, 18, when the fitting 10 is coupled to the valve body 14.

The sealing surface 46 may comprise a malleable metal, or another appropriate material such as molded plastic, so that a tight seal is formed between the periphery 53 of the aperture 28 and the sealing surface 46 to inhibit leaks therebetween. The plunger 44 may have a threaded periphery 54 to mate with the desired threaded port 16, 18. Threadably coupling the fitting 10 to the valve body 14 prevents the 10 fitting from inadvertently detaching from the valve 12, particularly when fluid is flowing therethrough under pressure.

A compression member 56 is also retained in the hollow body 40 of the invented fitting 10. The compression member 56 is retained within the body 40 between the plunger's flange end 50 and a press-fit seal 58 at a coupling end 60 of the body 40. The compression member 56 may comprise any suitable member for biasing the projecting end 44 of the plunger 44 outwardly from the hollow body 40, so that its sealing surface 46 contacts the periphery 53 of insert's aperture 28, when the fitting 10 is coupled to the selected port. In the preferred embodiment of the present invention 10, the compression member 56 comprises a spring member.

Preferably, the spring 56 is configured with an elastic force that is sufficient to press the sealing surface 46 of the plunger 44 against the periphery 53 of the aperture 28 with enough pressure to form a tight, continuous seal between the sealing surface 46 and the periphery 53 of the insert's aperture 28. The elastic force of the spring 56 also enables the spring 56 to be compressed, as the fitting 10 is threaded into and coupled to the selected inlet or outlet port 16, 18. This limits the pressure that the plunger's sealing surface 46 exerts on the insert's outer surface about the periphery 53 of the aperture 28 to prevent the sealing surface 46 from distorting or deforming. Since the integrity of the seal between the sealing surface 46 and aperture 28 is maintained, no gaps are formed therebetween and the formation of leaks is inhibited. Thus, the compression member 56 biases the plunger 44 outwardly with enough pressure to maintain a tight, continuous seal between with the insert's aperture 28 and fitting 10 to prevent leaks therebetween, while limiting the pressure that the plunger 44 exerts on the insert 26 to prevent the sealing surface 46 from deforming, further preventing leaks.

The fitting 10 of the present invention is coupled to an inlet or outlet port 16, 18 of the valve body 14 by first selecting the desired port. The plunger 44 is then threaded into the selected port, by rotating the fitting 10.

The flange end 50 of the plunger 44 is configured to prevent relative axial rotation between the plunger 44 and hollow body 40. The plunger 44 is threaded into the port until its sealing surface 46 abuts the periphery 53 of the aperture 28 of the insert 26 that is aligned with the selected port. This establishes a tight, continuous seal between the plunger 44 and insert 26, to prevent leaks therebetween.

The fitting 10 then continues to be threaded into the selected port until the seating shoulder 52a of the hollow body 40 contacts an outer surface 64 of the valve body 14. As the fitting 10 is threaded into the port 16, the elastic force of the spring 56 enables the spring 56 to be compressed to limit the pressure that the plunger's sealing surface 46 exerts on the insert 26 through the conduit's flanged end 42a. This enables the seal between the plunger 44, the conduit's flanged end and insert 26 to be maintained without causing the sealing surface 46 to deform against the outer surface of the insert 26.

Since the pressure that the plunger 44 exerts on the insert 26 is limited, deformation of the insert 26 is also prevented, thus further inhibiting the formation of leaks. Thus, the spring 56 biases the plunger 44 outwardly with enough pressure so that the sealing surface 46 forms a continuous, tight seal with the insert 26 to prevent leaks therebetween.

Thus there has been described an improved valve fitting. The fitting of the present invention limits the pressure that is exerted upon a surface of the valve, such as a component of the flow control assembly, by the sealing surface of the plunger. This inhibits the sealing surface from deforming, which may cause the valve to leak. The compression member causes the sealing surface of the fitting to exert a constant pressure across a sealing surface of a valve body and the conduit, when the fitting is coupled to the valve body in order to form a continuous seal between the fitting and the valve, without causing leaks therebetween. When the fitting is coupled to the valve body, the compression member is compressed to limit the pressure that the sealing surface exerts on the valve body, to inhibit the sealing surface from distorting or deforming against internal componentry of the valve which can form gaps between the sealing surface and componentry, causing the valve to leak.

Those skilled in the art will appreciate that various adaptations and modifications of the just-.described preferred embodiments can be configured without departing from the scope and spirit of the invention. Therefore, it is to be understood that, within the scope of the appended claims, the invention may be practiced other than as specifically described herein.

What is claimed is:

1. A fitting for a valve, the valve including an inlet port and at least one outlet port, an inner surface and an outer surface, a cavity, and a flow control assembly for controlling flow through the valve, the fitting comprising:

a hollow body having a first end configured to couple to a conduit and a second end provided with a seating shoulder to abut said outer surface of the valve;

a hollow plunger reciprocatingly retained in the hollow body, the plunger having a sealing surface that projects outwardly from the second end of the body, the seating shoulder preventing the plunger from being disposed excessively into a selected one of the inlet port and outlet port of the valve; and a compression member retained in the hollow body for biasing the plunger outwardly from the second end, the compression member biases the sealing surface of the plunger against an outer surface of the flow control assembly to maintain a tight seal therebetween, without deforming the sealing surface.

2. The fitting of claim 1 wherein the compression member limits the pressure that the sealing surface of the plunger exerts on the surface of the flow control assembly to inhibit the sealing surface from deforming for preventing leaks from forming therebetween, while maintaining a tight seal between the sealing surface and the surface of the flow control assembly.

3. The fitting of claim 2 wherein the periphery of the plunger is threaded to engage a predetermined one of the inlet port and outlet port of the valve for threadably coupling the fitting to the valve for preventing the fitting from detaching from the valve when a fluid is flowing through the fitting under pressure.

4. The fitting of claim 2 wherein the seating shoulder aids the compression member with preventing the sealing surface of the plunger from deforming to prevent leaks between the sealing surface and the surface of the flow control assembly.

5. The fitting of claim 4 wherein the fitting comprises chemically inert materials.

6. A shear valve comprising:

a valve body that has an inlet port and at least one outlet port and a cavity;

a flow control assembly for controlling a fluid flow through the valve body, the control assembly including a valve plug retained in the cavity and coupled to a valve driver for actuation thereby, the valve driver actuated for oscillating the valve plug in the cavity for sealing one of the inlet port, outlet port, and both the inlet and outlet ports to control flow though the cavity, and a hollow insert retained in the cavity, the insert configured to mate with the periphery of the valve plug for controlling flow through the valve body, the insert having apertures therethrough to enable flow through the inlet and outlet ports of the valve body; and a fitting configured to be coupled to one of the inlet port and outlet port of the valve body for conveying the fluid to and from the valve body, the fitting comprising, a hollow body having a first end configured to couple to a conduit for conveying the fluid to and from the valve body and a second end provided with a seating shoulder to abut an outer surface of the valve body, a hollow plunger reciprocatingly retained in the hollow body, the plunger having a flange end slidably retained in the hollow body and an sealing end that projects outwardly from the second end of the hollow body, the sealing end having a sealing surface configured to mate with the periphery an aperture through the insert to form a seal therebetween, the seating shoulder configured to abut the valve body to prevent the plunger from being disposed excessively into a selected one of an inlet port and outlet port of the valve body, and a compression member retained in the hollow body for biasing the plunger outwardly from the second end, the compression member configured with an elastic force that is sufficient to bias the sealing surface of the plunger against the periphery of the aperture of the insert to maintain a tight seal therebetween without deforming the sealing surface to inhibit leaks between the sealing surface and the periphery of the aperture.

7. The fitting of claim 6 wherein the inlet port and outlet port of the valve are threaded and the periphery of the plunger is threaded for threadably coupling the fitting to the valve for preventing the fitting from detaching from the valve when the fluid is flowing through the fitting under pressure.

8. The fitting of claim 7 wherein the seating shoulder prevents the plunger from being threaded excessively into the selected port to aid the compression member with limiting the pressure that the sealing surface exerts on the periphery of the aperture of the insert to prevent deformation of the sealing surface to prevent leaks between the sealing surface and the surface of the flow control assembly.

9. The fitting of claim 8 wherein the sealing surface comprises a malleable metal so that a tight seal is formed between the periphery of the aperture and sealing surface to inhibit leaks therebetween.

10. The fitting of claim 6 wherein the plunger is hollow to enable flow through the fitting.

11. The fitting of claim 6 wherein the fitting and components of the valve and flow control assembly comprise chemically inert materials.

* * * * *